United States Patent
Nangle

(10) Patent No.: US 7,330,954 B2
(45) Date of Patent: Feb. 12, 2008

(54) STORING INFORMATION IN ONE OF AT LEAST TWO STORAGE DEVICES BASED ON A STORAGE PARAMETER AND AN ATTRIBUTE OF THE STORAGE DEVICES

(75) Inventor: Peter Nangle, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 230 days.

(21) Appl. No.: 10/126,097

(22) Filed: Apr. 18, 2002

(65) Prior Publication Data

US 2003/0200400 A1    Oct. 23, 2003

(51) Int. Cl.
*G06F 12/00*    (2006.01)
*G06F 13/00*    (2006.01)

(52) U.S. Cl. .................. 711/170; 711/167; 711/123; 711/5; 713/320

(58) Field of Classification Search ........ 711/100–101, 711/147–148, 154, 156, 117, 126, 135–139, 711/3, 5, 103, 123, 167, 170; 713/320
See application file for complete search history.

(56) References Cited

U.S. PATENT DOCUMENTS

| | | | |
|---|---|---|---|
| 4,918,586 A | | 4/1990 | Niimura et al. |
| 4,992,977 A | * | 2/1991 | Matoba et al. ............... 711/143 |
| 5,249,286 A | * | 9/1993 | Alpert et al. ................ 711/125 |
| 5,297,148 A | * | 3/1994 | Harari et al. ................ 714/710 |
| 5,390,334 A | | 2/1995 | Harrison |
| 5,634,109 A | | 5/1997 | Chen et al. |
| 5,737,750 A | * | 4/1998 | Kumar et al. ................ 711/129 |
| 5,778,407 A | * | 7/1998 | Glew et al. ..................... 711/2 |
| 5,818,771 A | | 10/1998 | Yasu et al. |
| 5,845,311 A | | 12/1998 | Piguet et al. |
| 5,903,915 A | * | 5/1999 | Inman ........................ 711/167 |
| 6,096,089 A | | 8/2000 | Kageshima |
| 6,446,181 B1 | * | 9/2002 | Ramagopal et al. ........ 711/168 |
| 6,452,823 B1 | * | 9/2002 | Naji ............................. 365/50 |
| 6,718,426 B2 | * | 4/2004 | Naya et al. .................... 711/3 |
| 2002/0080662 A1 | * | 6/2002 | Yamazaki et al. .......... 365/200 |
| 2003/0051104 A1 | * | 3/2003 | Riedel ......................... 711/154 |

(Continued)

FOREIGN PATENT DOCUMENTS

EP    0 518 367 A1    12/1992

(Continued)

OTHER PUBLICATIONS

Yoon-Jong Song, Ferroelectric Thin Films for High Density Non-volatile Memories, Dissertation, Virginia Polytechnic Institute and State University, Blacksburg, VA, Aug. 1998, pp. 4-12.*

*Primary Examiner*—Hong Kim
(74) *Attorney, Agent, or Firm*—Trop, Pruner & Hu, P.C.

(57) ABSTRACT

Briefly, in accordance with an embodiment of the invention, a method to store information is provided, wherein the method includes generating a storage parameter to store information, wherein the storage parameter indicates use of the information by a software process and transferring the information to one of at least two memory devices based at least in part on the storage parameter and on a characteristic of the two memory devices.

13 Claims, 2 Drawing Sheets

| U.S. PATENT DOCUMENTS | | | | WO | WO 80/00383 | 3/1980 |
|---|---|---|---|---|---|---|
| 2003/0079084 A1* | 4/2003 | Gotoh et al. | 711/117 | WO | WO 01/73552 A2 | 3/2000 |
| | | | | WO | WO 00/38067 | 6/2000 |

FOREIGN PATENT DOCUMENTS

| EP | 0 952 524 A1 | 10/1999 |
|---|---|---|

* cited by examiner

STORING INFORMATION IN ONE OF AT LEAST TWO STORAGE DEVICES BASED ON A STORAGE PARAMETER AND AN ATTRIBUTE OF THE STORAGE DEVICES

BACKGROUND

Computing systems may include multiple or various kinds of memory devices. Determining the appropriate methods and memory apparatuses to store information in a particular system may be problematic. Factors such as cost of a memory apparatus, impact of a particular memory apparatus on system performance, etc., may be considered when designing a particular system.

Thus, there is a continuing need for alternate ways to store information.

BRIEF DESCRIPTION OF THE DRAWINGS

The subject matter regarded as the invention is particularly pointed out and distinctly claimed in the concluding portion of the specification. The claimed subject matter, however, both as to organization and method of operation, together with objects, features, and advantages thereof, may best be understood by reference to the following detailed description when read with the accompanying drawings in which:

Figure 1:
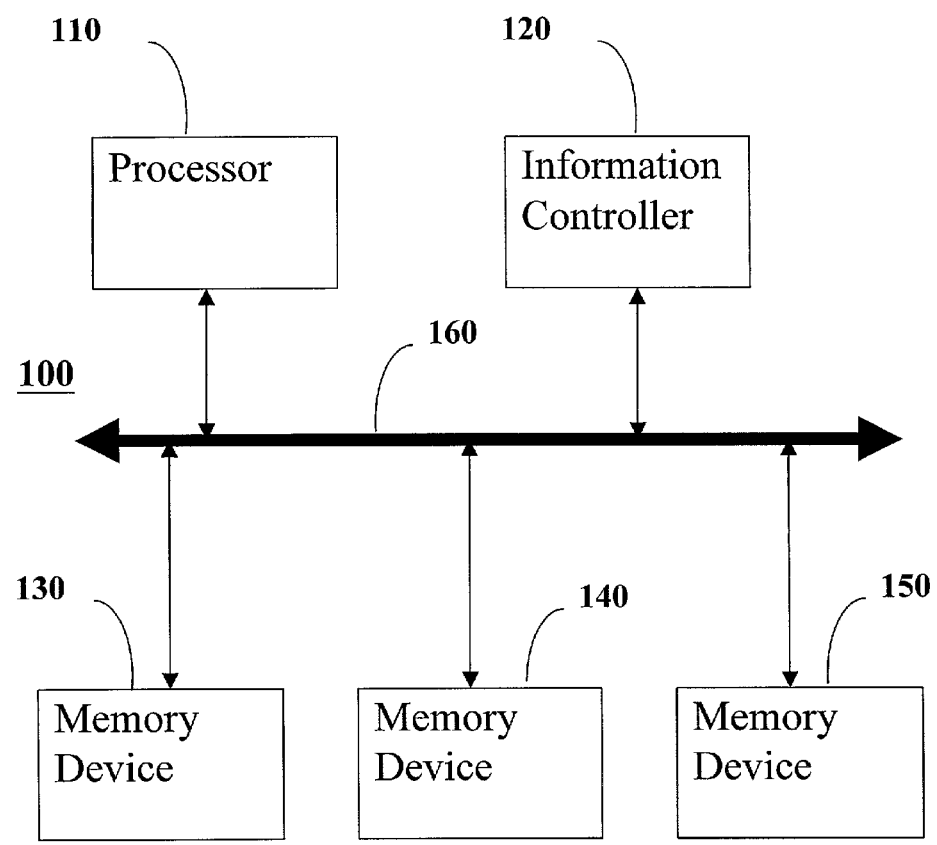
FIG. 1 is a block diagram illustrating a computing system in accordance with an embodiment of the claimed subject matter.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures, components and circuits have not been described in detail so as not to obscure the claimed subject matter.

Embodiments of the claimed subject matter may include an apparatus for performing the operations herein. This apparatus may be specially constructed for the desired purposes, or it may comprise a general purpose computing device selectively activated or reconfigured by a program stored in the device. Such a program may be stored on a storage medium, such as, but is not limited to, any type of disk including floppy disks, optical disks, CD-ROMs, magnetic-optical disks, electromechanical disks, read-only memories (ROMs), random access memories (RAMs), electrically programmable read-only memories (EPROMs), electrically erasable and programmable read only memories (EEPROMs), flash memory, magnetic or optical cards, or any other type of media suitable for storing electronic instructions and data.

Embodiments of the claimed subject matter are not described with reference to any particular programming language. It will be appreciated that a variety of programming languages may be used to implement the teachings of the claimed subject matter as described herein. For example, high-level procedural, object-oriented, assembly, or machine programming languages may be used to implement the claimed subject matter.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Turning to FIG. 1, an embodiment of a computing system 100 is illustrated. Computing system 100 may be used in a variety of applications such as, for example, a personal digital assistant (PDA), a two-way pager, a cellular phone, a portable computer, a desktop computer, a workstation, or a server. Although it should be pointed out that the scope and application of the claimed subject matter is in no way limited to these examples.

In this embodiment, computing system 100 may comprise a processor 110, an information controller 120, a memory device 130, a memory device 140, and a memory device 150 coupled to each other via a bus 160. Bus 160 may be a data path comprising, for example, a collection of data lines to transmit data from one part of computing system 100 to another.

Although the scope of the claimed subject matter is not limited in this respect, processor 110 may comprise, for example, one or more microprocessors, digital signal processors, microcontrollers, or the like. Processor 110 may execute a software process such as, for example, a software program or an operating system, wherein the software process may use digital information such as, for example, data and/or instructions.

In some embodiments, information controller 120 together with processor 110 may control memory devices 130, 140, and 150. For example, information controller 120 may control the transfer of information within computing system 100, e.g., between processor 110, information controller 120, and memory devices 130, 140, and 150. Information controller 120 may be integrated ("on-chip") with processor 110. In alternate embodiments, information controller 120 may be a discrete component or dedicated chip, wherein information controller 120 is external ("off-chip") to processor 110. In other embodiments, portions of the functionality of information controller 120 may be implemented in processor 110 as, for example, a software application, module, or routine. Information controller 120 may also be referred to as a memory controller or a data controller.

Memory devices 130, 140, and 150 may be referred to as storage devices and may be adapted to store information, such as, for example, instructions or data used by an operating system or a software program that may be executed by processor 110. Memory devices 130, 140, and 150 may have different physical characteristics, attributes, or properties such as, for example, different access times, power consumption, read cycle limitations, and/or write cycle limitations.

Access time may refer to the amount of time it takes to store information to or read information from a memory device. As an example, memory device 130 may be a relatively faster memory device compared to memory devices 140 and 150, i.e., the access time of memory device 130 may be less than the access times of memory devices 140 and 150, although the scope of the claimed subject matter is not limited in this respect. In one embodiment, memory device 130 may have an access time of less than one microsecond, e.g., approximately 10 nanoseconds. Memory device 140 may have a relatively slower access time compared to memory device 130, of at least one microsecond, e.g., approximately 10 microseconds. Memory device 150 may have a relatively slower access time compared to memory devices 130 and 140, of at least one millisecond, e.g., approximately 10 milliseconds.

In alternate embodiments, although the scope of the claimed subject matter is not limited in this respect, memory device 130 may have an access time of less than ten nanoseconds, e.g., approximately one nanosecond. Memory device 140 may have a relatively slower access time compared to memory device 130, of at least 10 nanoseconds, e.g., approximately 50 nanoseconds, and, memory device 150 may have a relatively slower access time compared to memory devices 130 and 140, of at least 100 nanoseconds, e.g., approximately 200 nanoseconds.

Power consumption or power dissipation of a memory device may be defined in terms of electrical current consumed by the memory device during operation of the memory device at a predetermined voltage potential. In one example, memory devices 130, 140, and 150 may be coupled to a power supply (not shown) that provides a power supply voltage potential of approximately three volts. In this example, memory device 130 may use about five milliamps (mA) of electrical current during a read or write operation. In alternate embodiments, the power consumption of memory devices 140 and 150 may be less than memory device 130. For example, although the scope of the claimed subject matter is not limited in this respect, memory devices 140 and 150 may use about one milliamp (mA) and about three milliamps (mA), respectively, of electrical current during a read or write operation. Also, power consumption of a memory device may vary depending on its operating voltage potential. In some embodiments, memory devices 130, 140, and 150 may operate at different operating voltage potentials.

A write cycle limitation may be an indication of endurance of a memory device and may refer to a threshold number of write operations that may be performed to a memory device. In some embodiments, if more than a predetermined number of write operations are performed, then the memory device's ability to store information may be degraded. For example, memory device 130 may have a write cycle limit of approximately $10^6$. In this example, if information is written to memory device 130 more than approximately $10^6$ times, then the ability of memory device 130 to store information may be degraded, e.g., storage errors may occur. In alternate embodiments, memory devices 140 and 150 may have write cycle limits of approximately $10^8$ and approximately $10^{12}$, respectively, although the scope of the claimed subject matter is not limited in this respect.

Memory devices 130, 140, and 150 may have read cycle limitations that indicate a threshold number of read operations that may be performed from a memory device. For example, memory devices 130, 140, and 150 may have read cycle limits of approximately $10^{12}$, $10^{18}$, and $10^{20}$, respectively, although the scope of the claimed subject matter is not limited in this respect.

In some embodiments, memory devices 130, 140, and 150 may have the same or substantially the same power consumption properties and access times, but may have different read/write cycling characteristics, although the scope of the claimed subject matter is not limited in this respect. In alternate embodiments, memory devices 130, 140, and 150 may have the same or substantially the same power consumption properties and read/write cycling characteristics, but may have different access times.

Although the scope of the claimed subject matter is not limited in this respect, memory device 130 may be a relatively smaller memory device compared to memory devices 140 and 150, e.g., the storage capability of memory device 130 may be less than the storage capability of memory devices 140 and 150. For example, memory device 130 may have a storage capacity of less than 32 megabits, e.g., approximately 16 megabits. Memory device 140 may have a relatively larger storage capacity compared to memory device 130, of at least 32 megabits, e.g., approximately 64 megabits. Memory device 150 may have a relatively larger storage capacity compared to memory devices 130 and 140, of at least 100 megabytes, e.g., approximately 500 megabytes. As another example, in alternate embodiments, memory device 130 may have a storage capacity of less than 256 megabits, e.g., approximately 64 megabits. Memory device 140 may have a relatively larger storage capacity compared to memory device 130, of at least 100 megabytes, e.g., approximately one gigabyte. Memory device 150 may have a relatively larger storage capacity, compared to memory devices 130 and 140, of at least one gigabyte, e.g., approximately 100 gigabytes or approximately one terabyte.

In some embodiments, memory device 130 may operate as a cache memory or disk cache for memory device 140 and/or for memory device 150. For example, as illustrated in some embodiments above, memory device 130 may be a relatively smaller and faster type of memory device compared to memory devices 140 and 150. Memory device 130 may cache frequently accessed information from memory devices 140 and 150 during operation of computing system 100, although the scope of the claimed subject matter is not limited in this respect. As frequently accessed information is requested from memory devices 140 and 150, it may be available in memory device 130, thereby avoiding a relatively longer search and fetch in memory devices 140 and 150. Therefore, overall system performance may be improved by caching information in memory device 130.

In some embodiments, memory devices 130, 140 and 150 may be volatile memories such as, for example, a static random access memory (SRAM) or a dynamic random access memory (DRAM), although the scope of the claimed subject matter is not limited in this respect. In alternate embodiments, memory devices 130, 140, and 150 may be nonvolatile memories such as, for example, an electrically programmable read-only memory (EPROM), an electrically erasable and programmable read only memory (EEPROM), a flash memory (NAND or NOR type, including multiple bits per cell), a ferroelectric random access memory (FRAM), a polymer ferroelectric random access memory (PFRAM), a magnetic random access memory (MRAM), an Ovonics Unified Memory (OUM), a disk memory such as, for example, an electromechanical hard disk, an optical disk, a magnetic disk, or any other device capable of storing instructions and/or data. Other types of nonvolatile memory are also within the scope of the claimed subject matter, including volatile memory with a battery backup, as the battery may prevent the memory from losing its contents when the main power source is off.

Figure 2:
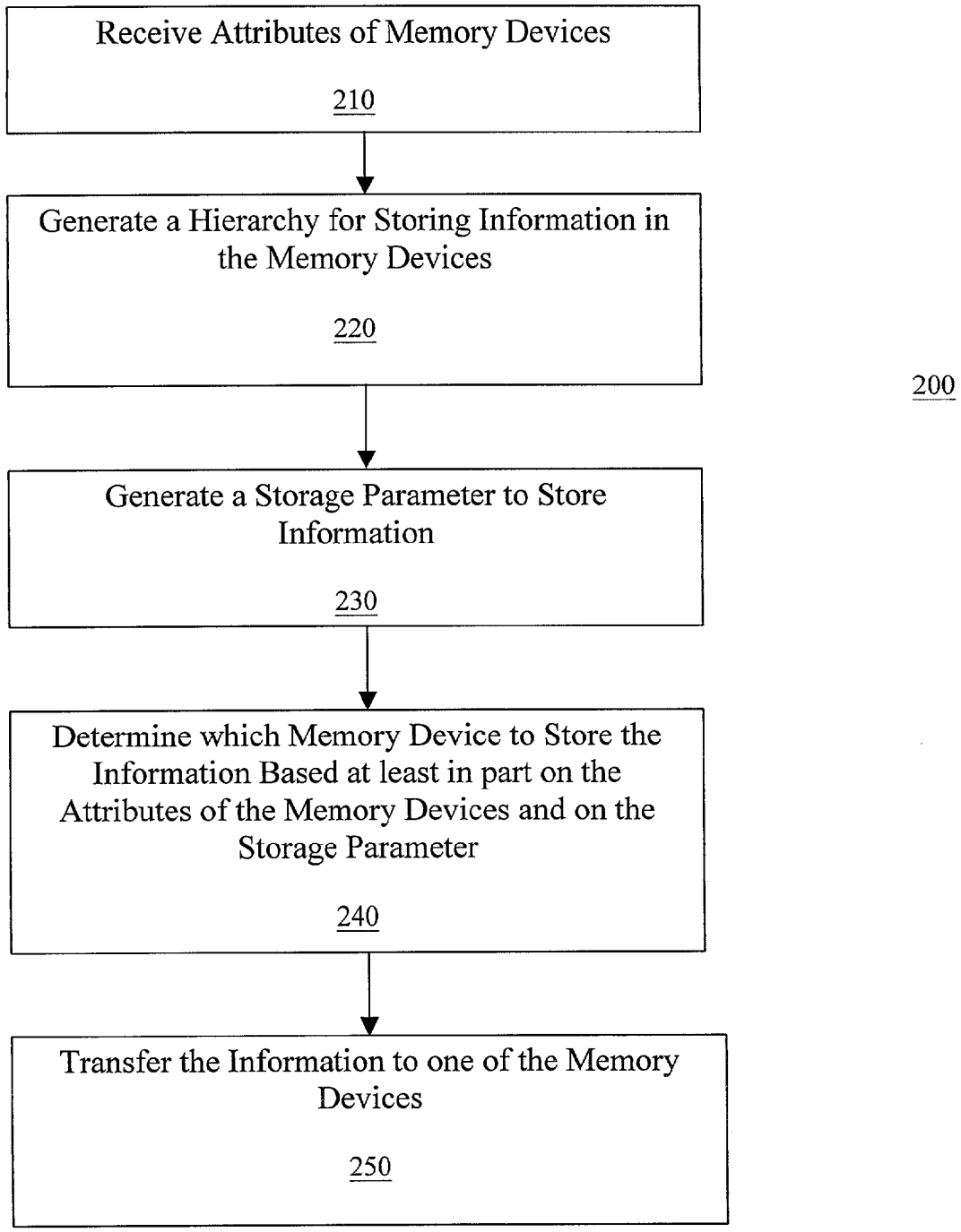
FIG. 2 is a flow chart illustrating a method to store information in accordance with an embodiment of the claimed subject matter.

Turning to FIG. 2, a method 200 to store information in accordance with an embodiment of the claimed subject matter is described. This method may be illustrated with reference to computing system 100 (FIG. 1). In some embodiments, processor 110 and/or information controller 120 may include circuitry, software, or a combination of circuitry and software to implement the method described in FIG. 2.

This embodiment may begin with receiving attributes of memory devices 130, 140, and 150 (block 210). These attributes may be referred to as characteristics or properties and may be physical attributes of the memory devices such as, for example, access time, power consumption, and/or read/write cycling information. In one embodiment, these attributes may be stored in memory devices 130, 140, or 150 and may be provided upon request by information controller 120. In this embodiment, each memory device may include attributes specific to the memory device. Alternatively, these attributes may be stored in a attribute table that may be centrally located in one of the memory devices or in another part of computing system 100 (e.g., within information controller 120).

A hierarchy for storing information in computing system 100 may be generated (block 220). For example, memory device 130 may be designated as the primary storage device for storing information. Similarly, memory devices 140 and 150 may be designated as secondary storage devices for storing information so that if the primary storage device is not available or not selected for storing information, information may be stored in the secondary storage devices. This designation may be made by a software process or an operating system and may be based on different factors such as, for example, on physical attributes such as access time or power consumption.

The embodiment illustrated in FIG. 2 may further include generating a storage parameter to store information (block 230). This storage parameter may be generated by a system designer or a software programmer or may be generated by a software process during execution of the software process. The storage parameter may be communicated to information controller 120 and may indicate a storage-related characteristic of the information that may be useful in storing the information. For example, the storage parameter may indicate whether the information is an instruction or data. In other words, the storage parameter may indicate whether the information is code or noncode data. In another embodiment, the storage parameter may indicate if the information is written or read relatively frequently to a memory device. For example, the storage parameter may indicate the rate, i.e., the number of writes or reads per unit of time, that the information is transferred to or from a memory device by, for example, a software process.

In alternate embodiments, the storage parameter may designate the information as performance-related or performance-critical information. For example, the storage parameter may indicate that processing of the information alters performance of the system more than a predetermined amount. In other words, the storage parameter may indicate that processing designated performance-related information affects performance of the system by more than a predetermined amount. Processing of information may refer to use of the information by a software process and/or storing of the information in a memory device. In one embodiment, performance of a computing system may be measured by executing a predetermined software program or a set of predetermined software programs to determine processing efficiency of the computing system by, for example, counting operations or instructions performed during execution of the predetermined software program or set of programs.

One factor that may affect system performance is processing of information, e.g., executing instructions or writing and reading of data and/or instructions to memory devices. Performance of a system may be communicated to information controller 120. In this example, information controller 120 may alter storage of information if an active process using the information is causing the system to operate at or below a predetermined level of performance. Information controller 120 may alter storage of information by moving the storage of the information from one memory device to another.

In alternate embodiments, the storage parameter may indicate use of the information by a software process executed by, for example, processor 110. For example, the storage parameter may indicate that the information is an instruction that is executed by the software process or may indicate that the information is noninstruction data that is used by the software process. As another example, the storage parameter may indicate that the information is transferred to or from a memory device by the software process at least a predetermined number of times or the storage parameter may indicate that the frequency or rate that the information is written to or read from a storage device by the software process.

The embodiment illustrated in FIG. 2 may further include determining which memory device of memory devices 130, 140, and 150 may be selected to store the information based at least in part on the attributes of memory devices 130, 140, and 150 and on the storage parameter (block 240). The determination may be made by information controller 120.

Storage information may be transferred to one of memory devices 130, 140, and 150 (block 250) based at least in part on the attributes of memory devices 130, 140, and 150 and on the storage parameter. In one embodiment, information controller 120 may determine that the access time of memory device 130 is less than the access times of memory devices 140 and 150. In this embodiment, if the storage parameter indicates that the information is an instruction and that the access time of memory device 130 is less than the access times of memory devices 140 and 150, then information controller 120 may transfer the information to memory device 130. As may be appreciated, in some computing systems it may be advantageous to store software instructions in a memory device having a relatively fast access time. Alternatively, in some computing systems it may be advantageous to store non performance-critical data in a memory device having a relatively slow access time. In these embodiments, if the storage parameter indicates that the information is data and that the access time of memory device 130 is greater than the access times of memory devices 140 and 150, then information controller 120 may transfer the information to memory device 130. In these embodiments, information controller 120 may request the access time information of memory devices 130, 140 and 150 and may receive storage information and a corresponding storage parameter. Information controller 120 may examine the access time information and the storage parameter to determine which memory device may be best suited for storing the information.

In some embodiments, if the storage parameter indicates the rate that the storage information is transferred to a memory device and that the rate is at or above a predetermined threshold level, then information controller 120 may transfer the information to memory device 130 if the access time of memory device 130 is less than the access times of memory devices 140 and 150. As may be appreciated, in some computing systems it may be advantageous to store frequently written information in a memory device having a relatively fast access time.

In other embodiments, if the storage parameter indicates the rate that the storage information is transferred to a memory device and indicates that the rate is at or above a predetermined level, then information controller 120 may transfer the information to memory device 130 if the write cycle limit of memory device 130 is greater than the write cycle limits of memory devices 140 and 150. As may be appreciated, in some computing systems it may be advantageous to store frequently written information in a memory device having a relatively high write cycle limit.

In alternate embodiments, if the storage parameter indicates that the rate that the storage information is accessed or read from a memory device and indicates that the rate is at or above a predetermined level, then information controller 120 may transfer the information to memory device 130 if the read cycle limit of memory device 130 is greater than the read cycle limits of memory devices 140 and 150. As may be appreciated, in some computing systems it may be advantageous to store frequently read information in a memory device having a relatively high read cycle limit.

In some embodiments, if the storage parameter indicates the 111 number of times that the storage information is written to or read from a memory device and indicates that the number of times is equal to or greater than a predetermined number, then information controller 120 may transfer the information to memory device 130 if memory device 130 consumes less power during read and write operations than memory devices 140 and 150. As may be appreciated, in some computing systems it may be advantageous to store frequently read and written information in a memory device having relatively lower power consumption properties. In a computing system that receives its operating voltage potential from a battery, reducing the power consumption of the computing system during operation may extend battery life.

In alternate embodiments, other factors, such as, for example, the hierarchy of memory devices for storing the information, may be used to determine which memory device to store the information, although the scope of the claimed subject matter is not limited in this respect. For example, the hierarchy for storing information in computing system 100 may be communicated to information controller 120. In this example, in addition to considering storage parameters associated with storage information and memory device attributes, information controller 120 may also examine the hierarchy information to determine which memory device to store the storage information.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A method, comprising:
    generating a storage parameter to store information, wherein the storage parameter indicates whether the information is an instruction or data;
    selecting one of at least two memory devices which do not store said information, to store said information based at least, in part, on the storage parameter and an access time attribute of the two memory devices; and
    transferring the information to a first memory device of the at least two memory devices if an access time of the first memory device is less than an access time of a second memory device of the at least two memory devices and if the storage parameter indicates that the information is an instruction.

2. The method of claim 1, wherein the attribute is access time and further comprising transferring the information to a first memory device of the at least two memory devices if an access time of the first memory device is greater than an access time of a second memory device of the at least two memory devices and if the storage parameter indicates that the information is data.

3. The method of claim 1, further comprising requesting a physical attribute of a first memory device of the two memory devices and requesting a physical attribute of a second memory device of the two storage devices.

4. The method of claim 3, wherein requesting the physical attribute of the first memory device comprises requesting power consumption information of the first memory device and requesting the physical attribute of the second memory device comprises requesting power consumption information of the second memory device.

5. The method of claim 3, wherein requesting the physical attribute of the first memory device comprises requesting read cycle limitation information of the first memory device and requesting the physical attribute of the second memory device comprises requesting read cycle limitation information of the second memory device.

6. A method, comprising:
    generating a storage parameter to store information, wherein the storage parameter indicates that the information is an instruction that is executed by a software process or that the information is data that is used by the software process;
    determining whether to store the information in a first storage device or a second storage device, neither of which is storing said information, based at least in part on the storage parameter, on a physical characteristic of the first storage device, and on a physical characteristic of the second storage device; and
    examining the physical characteristic of the first storage device and the physical characteristic of the second storage device by examining an access time of the first storage device and examining the physical characteristic of the second storage device comprises examining an access time of the second storage device.

7. The method of claim 6, wherein examining the physical characteristic of the first storage device comprises examining power consumption of the first storage device and examining the physical characteristic of the second storage device comprises examining power consumption of the second storage device.

8. The method of claim 6, wherein examining the physical characteristic of the first storage device comprises examining read or write cycle information of the first storage device and examining the physical characteristic of the second storage device comprises examining read or write cycle information of the second storage device.

9. An article comprising a storage medium having stored thereon instructions, that, when executed by a computing platform, result in:
    generating a storage parameter to store information, wherein the storage parameter indicates whether the information is an instruction or data;

selecting one of at least two storage devices which do not store said information, to store said information based at least in part on the storage parameter and an attribute of the two storage devices; and transferring the information to one of the at least two storage devices based at least in part on access time of the at least two storage devices, power consumption of the at least two storage devices, read cycle characteristics of the at least two storage devices, or write cycle characteristics of the at least two storage devices.

10. The article of claim 9, wherein the attribute is access time and wherein the instructions, when executed, further result in: transferring the information to a first storage device of the at least two storage devices if an access time of the first storage device is less than an access time a second storage device of the at least two storage devices and if the storage parameter indicates that the information is an instruction.

11. A system, comprising:
a processor to communicate a storage parameter to store information, wherein the storage parameter indicates whether the information is an instruction or data;
a first nonvolatile memory device having an access time and not storing said information;
a second nonvolatile memory device having an access time, and not storing said information, wherein the access time of the first nonvolatile memory device is different than the access time of the second nonvolatile memory device; and
a controller to transfer the information to either the first nonvolatile memory device or the second nonvolatile memory device based at least in part on the storage parameter, the access time of the first nonvolatile memory device, and the access time of the second nonvolatile memory device.

12. The system of claim 11, further including a third nonvolatile memory device, wherein the controller is further adapted to transfer the information to either the first nonvolatile memory device, the second nonvolatile memory device, or the third nonvolatile memory device based at least in part on a physical characteristic of the third nonvolatile memory device.

13. The system of claim 11, wherein the first nonvolatile memory device is a cache memory for the second nonvolatile memory device.

* * * * *